United States Patent
Eom

(10) Patent No.: US 10,429,683 B2
(45) Date of Patent: Oct. 1, 2019

(54) DISPLAY DEVICE

(71) Applicant: LG Display Co., Ltd., Seoul (KR)

(72) Inventor: HyeonYong Eom, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/173,371

(22) Filed: Oct. 29, 2018

(65) Prior Publication Data

US 2019/0129234 A1    May 2, 2019

(30) Foreign Application Priority Data

Oct. 30, 2017 (KR) .................. 10-2017-0142429

(51) Int. Cl.
*G06F 1/16* (2006.01)
*G02F 1/1333* (2006.01)

(52) U.S. Cl.
CPC ...... *G02F 1/133308* (2013.01); *G06F 1/1601* (2013.01); *G02F 2001/133314* (2013.01); *G02F 2201/46* (2013.01)

(58) Field of Classification Search
CPC . G02F 1/133308; G06F 1/1601; G06F 1/1616
See application file for complete search history.

(56) References Cited

U.S. PATENT DOCUMENTS

| | | | | |
|---|---|---|---|---|
| 9,058,758 B2* | 6/2015 | Shin | ..................... | G09G 3/3688 |
| 9,843,758 B2* | 12/2017 | Park | ..................... | G06F 1/1601 |
| 2014/0036162 A1* | 2/2014 | Sato | ..................... | G06F 1/1652 |
| | | | | 348/836 |
| 2015/0009635 A1* | 1/2015 | Kang | ..................... | G09F 9/301 |
| | | | | 361/74 |
| 2015/0029166 A1* | 1/2015 | Park | ..................... | G06F 1/1601 |
| | | | | 345/184 |
| 2015/0035812 A1* | 2/2015 | Shin | ..................... | G09G 3/3688 |
| | | | | 345/204 |
| 2016/0216739 A1* | 7/2016 | Choi | ..................... | G06F 1/1652 |

* cited by examiner

*Primary Examiner* — Hoa C Nguyen
*Assistant Examiner* — Keith DePew
(74) *Attorney, Agent, or Firm* — Morgan, Lewis & Bockius LLP

(57) ABSTRACT

Embodiments of the present disclosure relate to a display device. The embodiments of the present disclosure provide a display device in which a curvature adjustment member with a simple structure is provided on the inner plate and the back cover on which the display panel is supported, so that the curvature of the display panel can be finely adjusted, thereby enhancing the user's convenience and product satisfaction.

9 Claims, 10 Drawing Sheets

DISPLAY DEVICE

CROSS REFERENCE TO RELATED APPLICATION

This application claims priority from Korean Patent Application No. 10-2017-0142429, filed on Oct. 30, 2017, which is hereby incorporated by reference for all purposes as if fully set forth herein.

BACKGROUND

1. Technical Field

Embodiments disclosed herein relate to a display device, and more particularly, to a display device, in which the curvature of a display panel can be adjusted using a curvature adjustment member having a simple structure so that it is possible to greatly reduce the number of components and weight, and a flat panel and a back cover are used in common without large restrictions in a manufacturing apparatus, a process, or the like, so that it is possible to implement various curvatures required by consumers.

2. Discussion of the Related Art

In general, various flat panel display devices are actively being researched, including liquid crystal display devices, plasma display devices, field emission display devices, light-emitting display devices, and the like. However, the liquid crystal display device and the light-emitting display device are in the spotlight due to advantages of mass production technology, ease of driving means, and implementation of high image quality.

Recently, along with the research and development in terms of the technical shortcomings of flat panel display devices, needs for research and development are particularly emphasized in terms of the structural aspects of curved display products which are capable of attracting consumers' attention.

Accordingly, there is increasing demand for curved surface display devices or curved display devices having a curvature in display devices.

A related art display device 100 illustrated in FIG. 1 includes a display panel 110, an external case 120 that accommodates the display panel 110, and an abutment 130 that is connected to the lower end or a rear portion of the external case 120 so as to be fixed to a desk or a wall surface.

The display device operates in a planar mode and a curved mode by a curvature changing device 140 mounted on the rear surface of the display panel 110.

That is, a plurality of joint plates 150, which are respectively connected to a plurality of motors 160, are bent to have a predetermined angle by driving the motor 160, thereby changing the curvature of the display panel 110.

However, such a curved surface display device or a curved display device has a structure in which respective joint plates, which are curvature changing devices, have to be coupled to the rear surface of the display panel, which increases the number of components, work processes, and manufacturing costs.

In addition, since the structure is configured to change the curvature by operating the motor, operation noise is large, power consumption is increased, and the external case should be separated and repaired when the motor fails. Accordingly, there have been complaints from consumers.

Therefore, it is necessary to study a display device that is capable of realizing various curvatures without being limited in terms of manufacturing apparatus and process while reflecting various curvatures required by consumers.

SUMMARY

Accordingly, embodiments of the present disclosure are directed to a display device that substantially obviates one or more of the problems due to limitations and disadvantages of the related art.

An aspect of the present disclosure is to provide a display device, in which the curvature of a display panel is adjustable with a curvature adjustment member having a simple structure, thereby greatly reducing the number and weight of components, and various curvatures required by consumers can be implemented without substantial restrictions in a manufacturing apparatus, a process, or the like.

Another aspect of the present disclosure is to provide a display device, in which when the front surface of a display panel is deformed into a concave cup-shaped curved surface due to a manufacturing tolerance of the flat display panel and thermal expansion of the display panel during use, the curved shape can be adjusted into the flat shape again, thereby enhancing the user's convenience and product satisfaction.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display device in which a curvature adjustment member with a simple structure is provided on the inner plate and the back cover on which the display panel is supported, so that the curvature of the display panel can be finely adjusted, thereby enhancing the user's convenience and product satisfaction.

As described above, according to the embodiments of the present disclosure, it is possible to provide a display device in which the curvature of a display panel is adjustable with a curvature adjustment member having a simple structure, thereby greatly reducing the number and weight of components, and various curvatures required by consumers can be implemented without substantial restrictions in a manufacturing apparatus, a process, or the like.

In addition, according to the embodiments of the present disclosure, when the front surface is deformed into a concave cup-shaped curved surface due to a manufacturing tolerance of the flat display panel and thermal expansion of the display panel during use, it is possible to adjust the curved shape into the flat shape again, and thus the user's convenience and product satisfaction can be improved.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1:
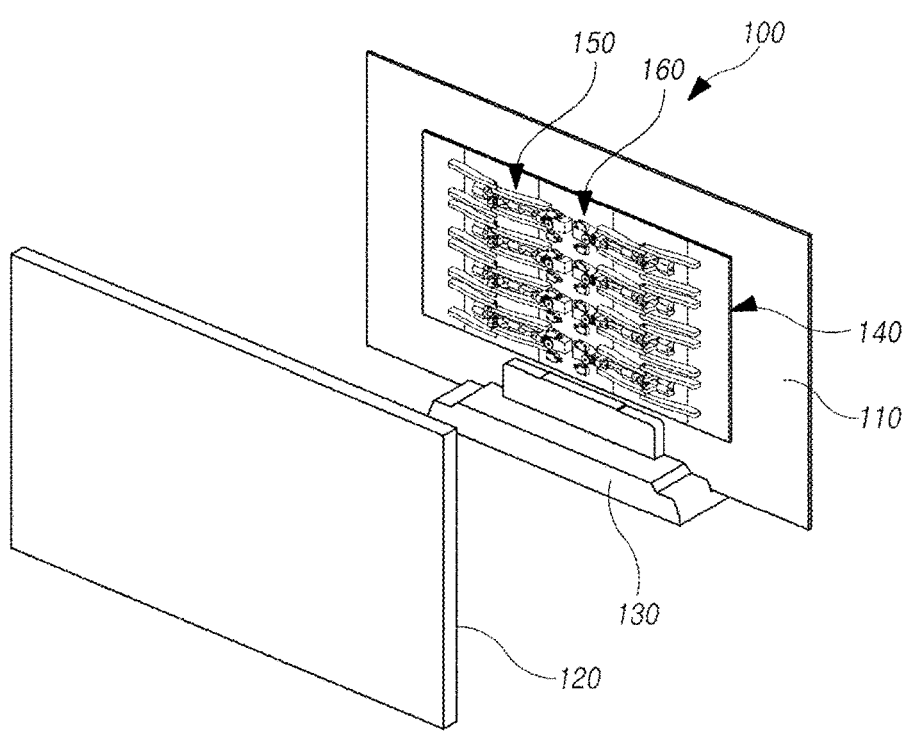
FIG. 1 is an exploded perspective view schematically illustrating a related art display device.

Hereinafter, example embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
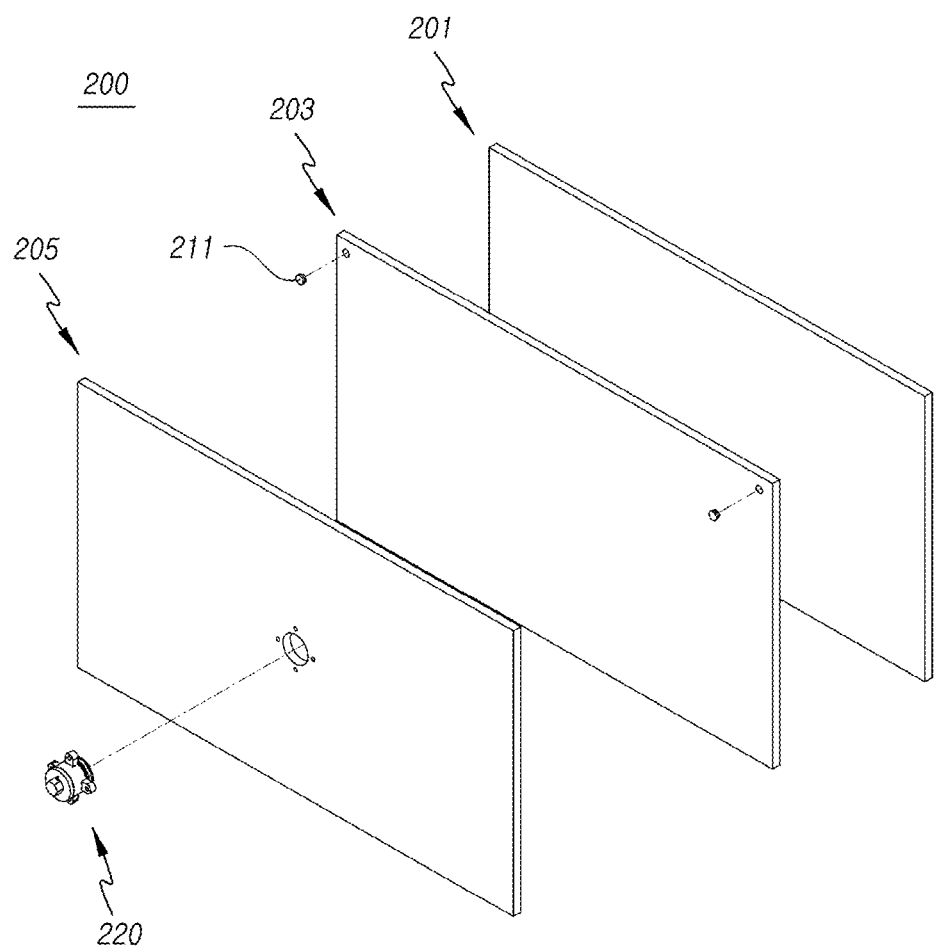
FIG. 2 is an exploded perspective view schematically illustrating a display device according to embodiments of the present disclosure.
Figure 3:
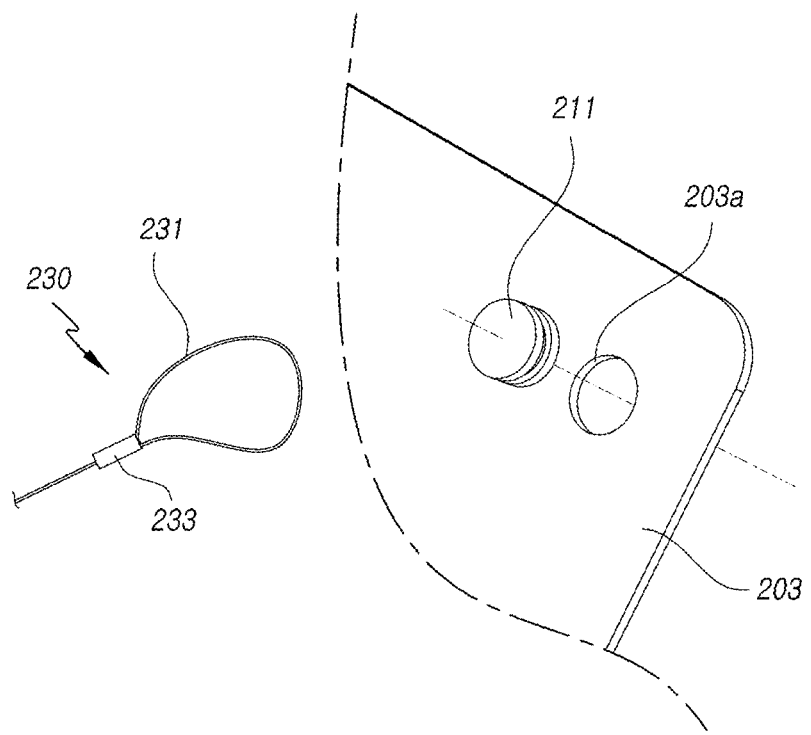
FIG. 3 is a perspective view illustrating a part of a display device according to embodiments of the present disclosure.
Figure 4:
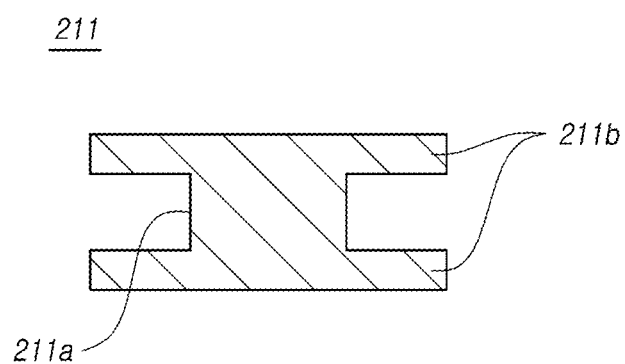
FIG. 4 is a cross-sectional view illustrating a part of a display device according to embodiments of the present disclosure.
Figure 5:
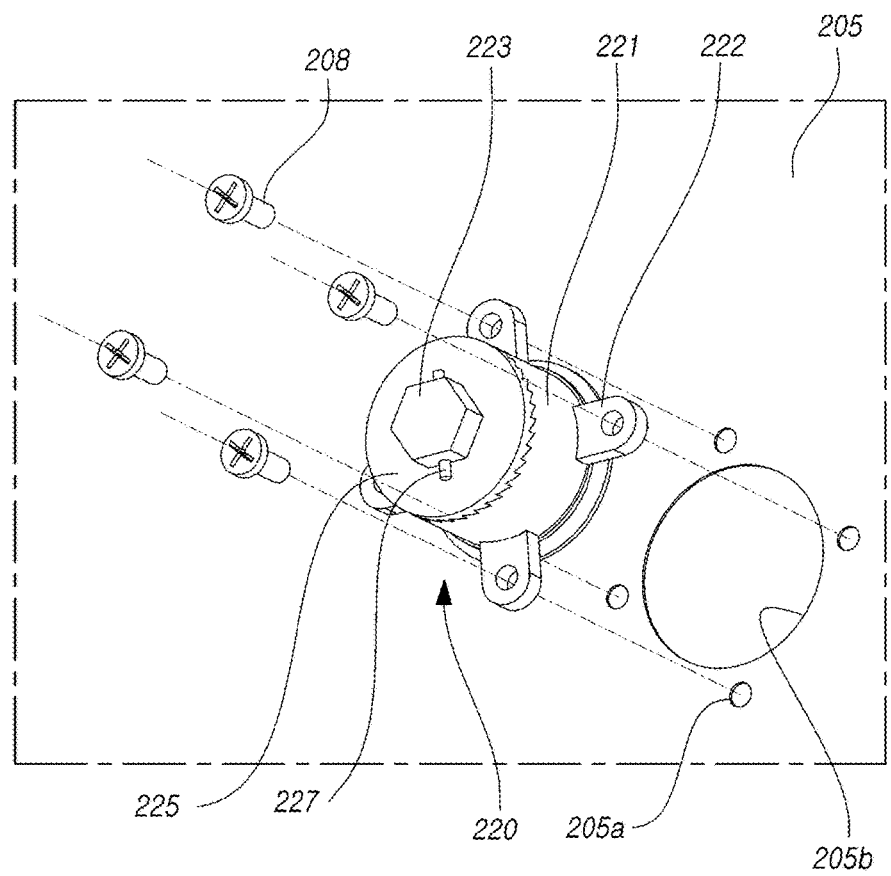
FIG. 5 is a perspective view illustrating a part of a display device according to embodiments of the present disclosure.
Figure 6:
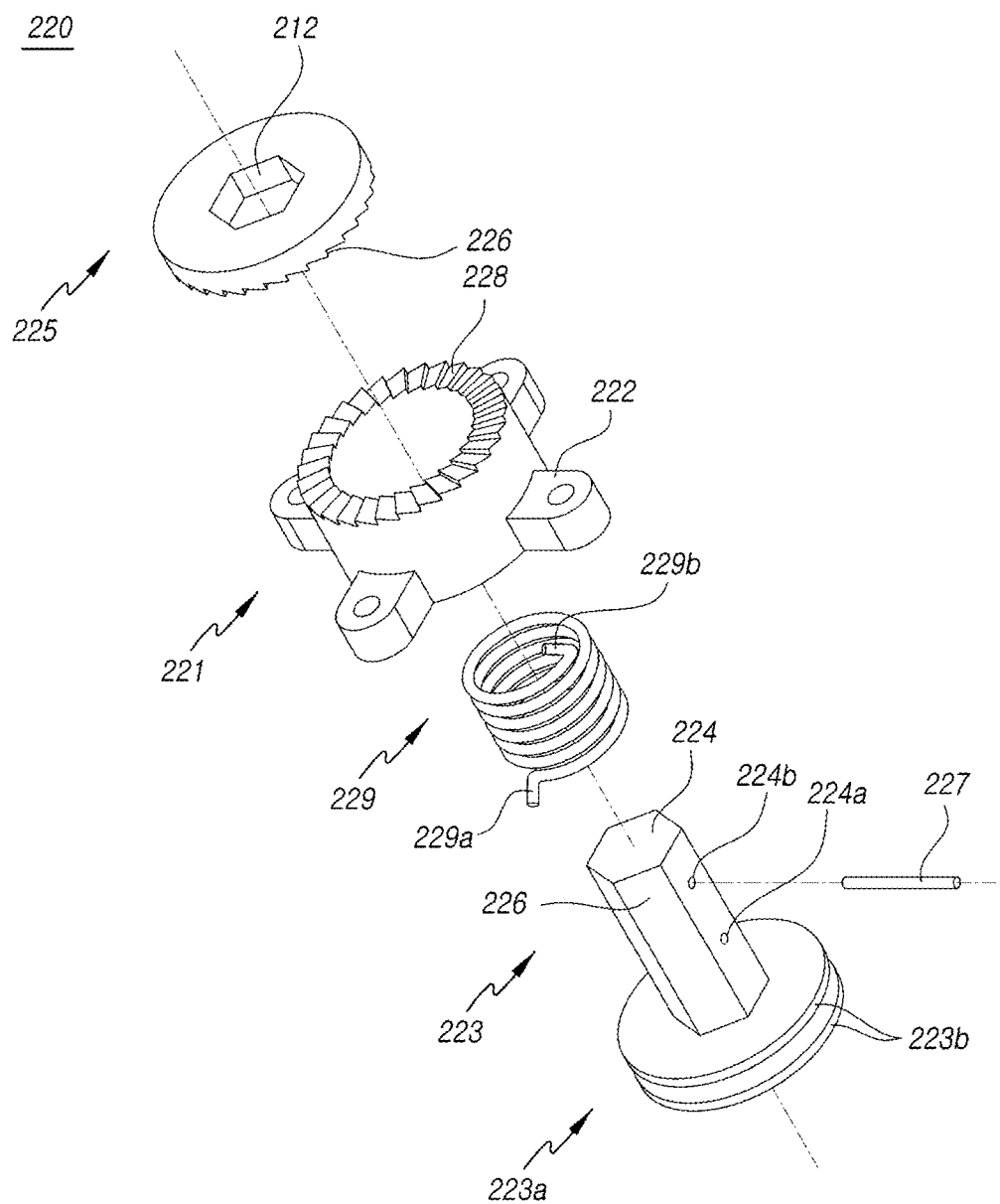
FIG. 6 is an exploded perspective view illustrating a part of a display device according to embodiments of the present disclosure.
Figure 7:
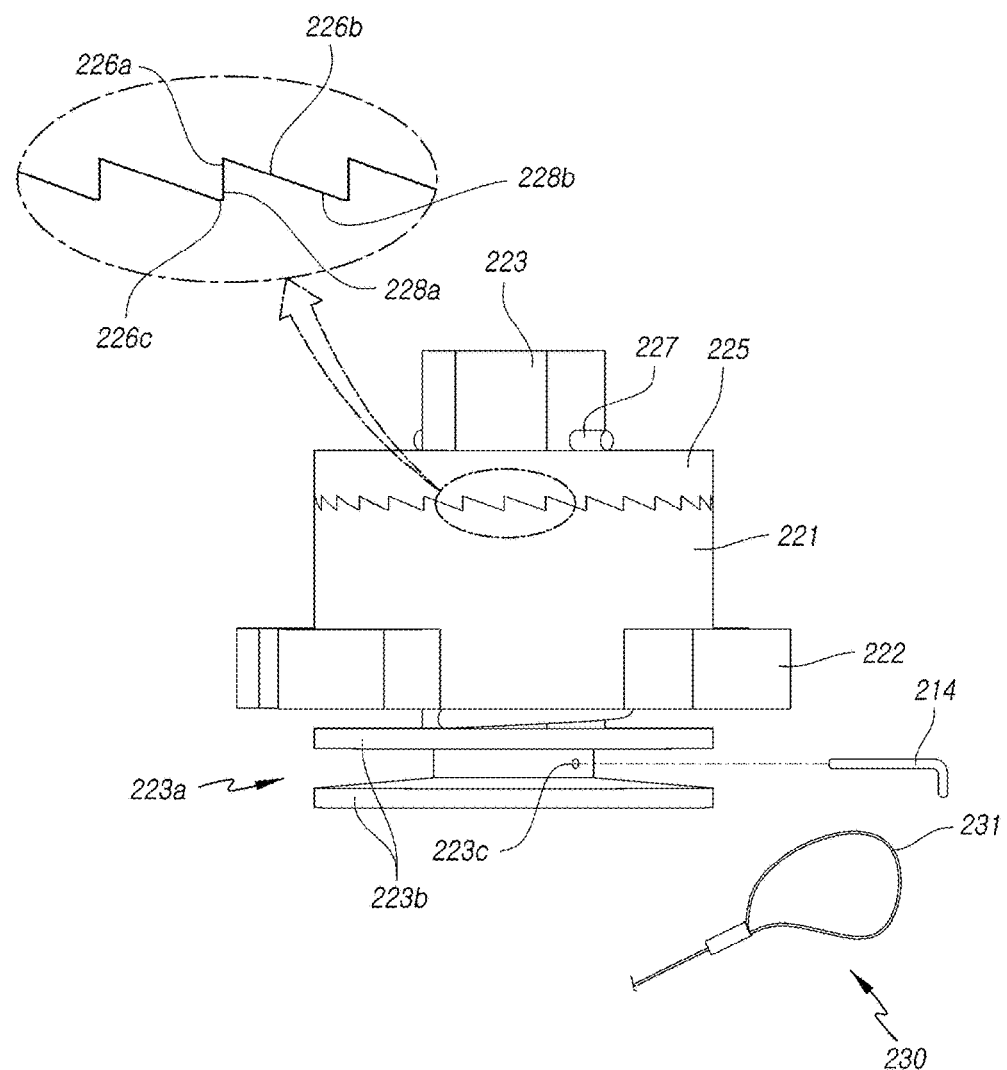
FIG. 7 is a side view illustrating a part of a display device according to embodiments of the present disclosure.
Figure 8:
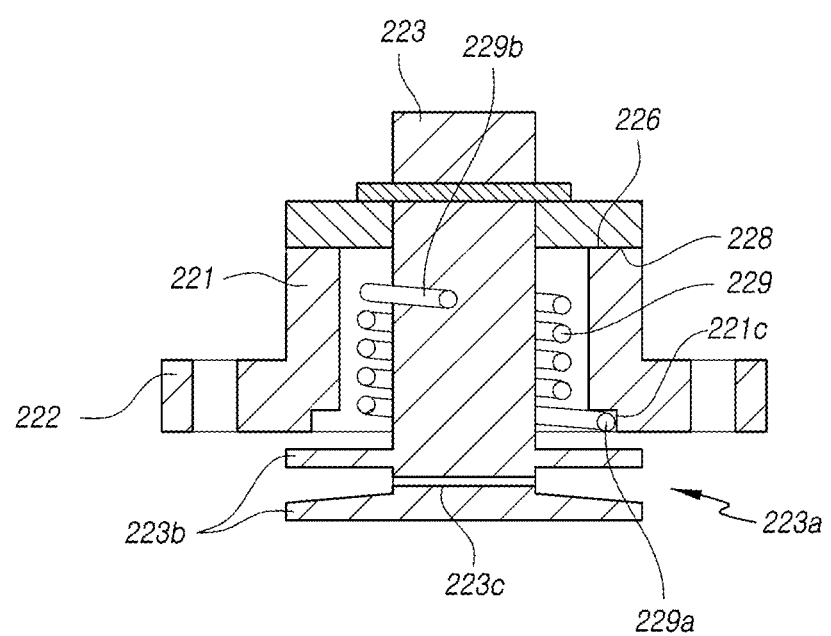
FIG. 8 is a cross-sectional view illustrating a part of a display device according to embodiments of the present disclosure.
Figure 9:
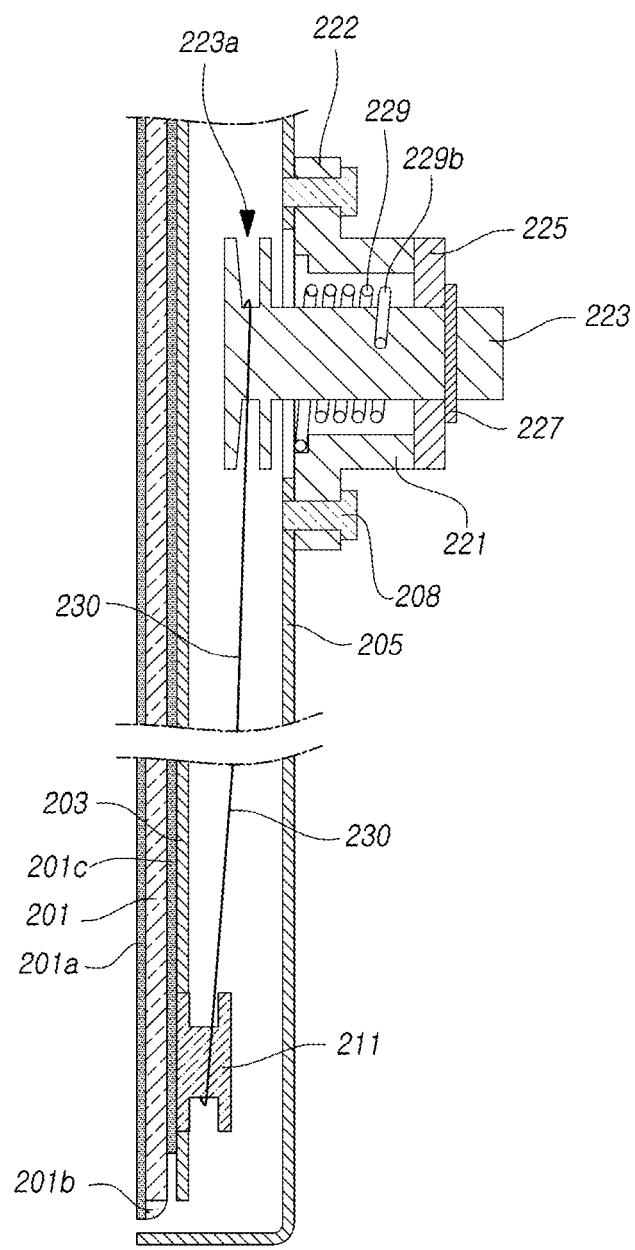
FIG. 9 is a cross-sectional view illustrating a display device according to embodiments of the present disclosure.
Figure 10:
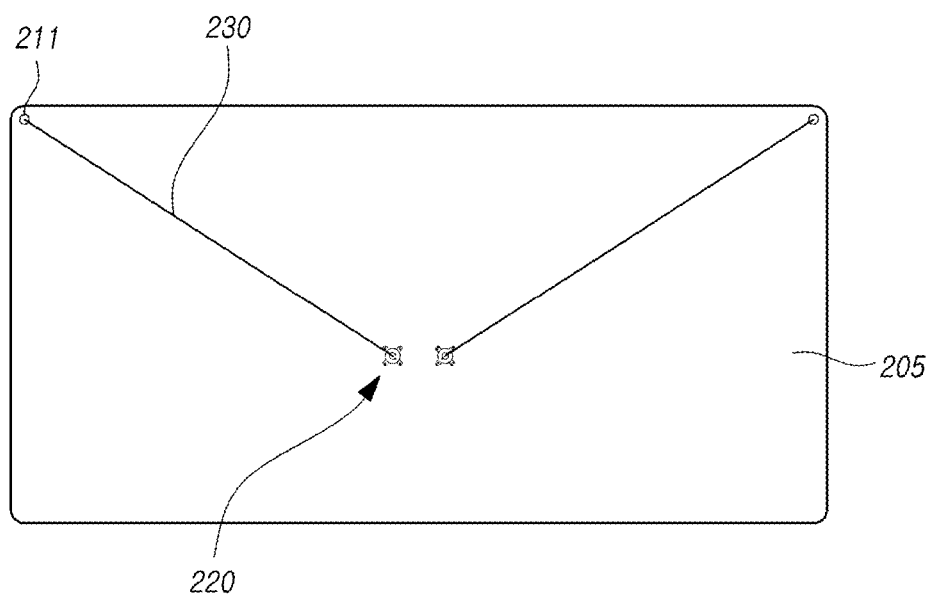
FIG. 10 is a rear view illustrating a display device according to embodiments of the present disclosure.

FIG. 2 is an exploded perspective view schematically illustrating a display device according to embodiments of the present disclosure, FIG. 3 is a perspective view illustrating a part of a display device according to embodiments of the present disclosure, FIG. 4 is a cross-sectional view illustrating a part of a display device according to embodiments of the present disclosure, FIG. 5 is a perspective view illustrating a part of a display device according to embodiments of the present disclosure, FIG. 6 is an exploded perspective view illustrating a part of a display device according to embodiments of the present disclosure, FIG. 7 is a side view illustrating a part of a display device according to embodiments of the present disclosure, FIG. 8 is a cross-sectional view illustrating a part of a display device according to embodiments of the present disclosure, FIG. 9 is a cross-sectional view illustrating a display device according to embodiments of the present disclosure, and FIG. 10 is a rear view illustrating a display device according to embodiments of the present disclosure.

As illustrated in these figures, a display device 200 according to the embodiments of the present disclosure includes a display panel 201, an inner plate 203 on which the rear surface of the display panel 201 is supported, a back cover 205 provided on the rear surface of the inner plate 203 such that the display panel 201 and the inner plate 203 are embedded inside, and curvature adjustment members 211, 220, and 230 including a wire fixing member 211 coupled to at least one corner portion of the inner plate 203 and a wire winding member 220 coupled to a central portion of the back cover 205 so as to adjust the tension of a wire 230 connected to the wire fixing member 211.

The display device 200 according to embodiments of the present disclosure includes the simple curvature adjustment members 211, 220, and 230 on the inner plate 203 and the back cover 205 on which the display panel 201 is supported, so that the curvature of the display panel 201 can be finely adjusted according to a user's needs. In particular, when the front surface of a flat display panel 201 is deformed into a curved surface of a concave cup shape due to a manufacturing tolerance of the flat panel display panel 201 and the thermal expansion of the display panel 201 during use, it is possible to adjust the deformed shape to the flat shape again, thereby improving the user's convenience and product satisfaction.

Here, the display device according to embodiments of the present disclosure may be implemented regardless of whether the display panel 201 is a flat panel display panel or a curved panel display panel.

In addition, although the display panel 201 having a planar front surface is illustrated as an example in the drawings illustrating embodiments of the present disclosure for the curvature adjustment of the display panel 201, the present disclosure is not limited thereto. When the display panel is a curved surface display panel having a concave cup-shaped front surface, it is also possible to implement curvature adjustment of the cup-shaped front surface to a flat shape.

In addition, in the embodiments of the present disclosure, the display panel 201 may be a liquid crystal display panel or may be applied irrespective of a light-emitting display panel.

That is, when the display panel 201 is configured with a liquid crystal display panel, the display panel 201 may further include a backlight unit configured to emit light to the liquid crystal display panel, a lower polarization plate attached to a lower substrate, and an upper polarization plate attached to the front surface of the upper substrate. The specific configurations of the lower substrate and the upper substrate may be formed in various forms known in the art depending on the driving mode of a liquid crystal panel, for example, a Twisted Nematic (TN) mode, a Vertical Alignment (VA) mode, an In-Plane Switching (IPS) mode, a Fringe Field Switching (FFS) mode, and the like.

In addition, when the display panel 201 is configured with a light-emitting display panel, the light-emitting display panel may include a lower substrate including a plurality of light-emitting cells each foiled for a region defined by a gate line, a data line, and a power source VDD, and an upper substrate facing and bonded to the lower substrate.

Each of the plurality of light emitting cells formed on the lower substrate may include at least one switching transistor connected to the gate line and the data line, at least one driving transistor connected to the switching transistor and the power supply (VDD) line, and a light-emitting element (e.g., an OLED) that emits light by a current controlled according to the switching of the driving transistor. The upper substrate may include a moisture absorbent or the like in order to protect the light emitting element from moisture or oxygen in the air.

In this case, the upper substrate may further include a light-emitting element connected to the driving transistor. In this case, the light emitting element of the lower substrate may be omitted.

In the embodiments of the present disclosure, the light-emitting display panel 201 is illustrated as an example, but does not illustrate a backlight unit that emits light to a panel due to the self-light emission structure. Hereinafter, descriptions will be made based on the light-emitting display panel 201.

An organic compound in the pixel array of the light-emitting display panel may deteriorate when exposed to moisture or oxygen. Thus, in order to prevent such a pixel deterioration problem, an encapsulation member 201c may be bonded to the rear surface of the display panel 201 so as to seal the pixel array.

In addition, in order to prevent a phenomenon in which light leakage occurs as the light from the pixel array is emitted through a side surface, a side seal member 201b may be provided on the side surface of the display panel 201, and a polarization film 201a may be bonded to the front surface of the display panel 201.

Here, the side seal member 201b may be made of a polymer material added with a black pigment, and the side seal member 201b absorbs light emitted from the pixel array so that light emitted through the side surface of the display panel 201 is not visible.

On the rear surface of at least one end of the display panel 201 formed in a rectangular shape, a plurality of flexible circuit films on which ICs are mounted are electrically connected to the display panel 201 and the printed circuit board.

In addition, the plurality of flexible circuit films may be attached to the display panel 201 and the printed circuit board using a resin or the like through a Tape Automated Bonding (TAB) process, and may be formed of a Tape Carrier Package (TCP), or a Chip On Flexible board or Chip On Film (COF).

Accordingly, the display panel 201 is electrically joined or connected to the printed circuit board through a plurality of flexible circuit films, and the printed circuit board is electrically connected to the plurality of flexible circuit films so as to provide various signals for displaying an image on the display panel 201.

The printed circuit board is electrically connected to a plurality of circuit films so as to provide various signals for displaying an image on the display panel 201. A driving IC configured to drive the display panel 201 is mounted on the printed circuit board.

The rear surface of the display panel 201 is coupled to the back cover 205 by the inner plate 203 and an adhesive member (not illustrated) having a predetermined thickness is provided between the inner plate 203 and the back cover 205.

Here, the back cover 205 may be formed of a metal material such as aluminum, an aluminum alloy, stainless steel, or an electro galvanized steel sheet, a glass material, a plastic material, or the like. In the embodiments of the present disclosure, a material other than the above-mentioned materials may be used as long as it can sustain the force for bending the display panel 201 and the inner plate 203 at a predetermined curvature without deformation.

The curvature adjustment members 211, 220 and 230 provided on the inner plate 203 and the back cover 205 are configured such that the wire fixing member 211 and the wire winding member 220 are connected by the wire 230, so that the curvatures of the display panel 201 and the inner plate 203 can be adjusted by the tension of the wire 230.

That is, the wire fixing member 211 is coupled to at least one of the corner portions of the inner plate 203, and the wire winding member 220 is fixed to the central portion of the back cover 205 provided on the rear surface of the inner plate 203 such that the curvatures of the display panel 201 and the inner plate 203 are adjusted by adjusting the tension of the wire 230 connected to the wire fixing member 211.

As illustrated in FIG. 4, the wire fixing member 211 includes a small diameter portion 211a to which a wire 230 is coupled at the central portion thereof and large diameter portions 211b having an enlarged diameter and provided at the opposite sides in the axial direction of the small diameter portion 211a, so that the wire 230 is supported and prevented from being separated by the large diameter portions 211b when the wire 230 is pulled.

Here, the wire 230 is formed of a metal such as spring steel, steel, stainless steel, or titanium and has a shape of a ring 231 to be hooked and fixed to the wire fixing member 211, and the end of the ring is fixed to a connecting body 233 configured to prevent the ring 233 from being released.

In addition, the rear surface of the inner plate 203 is provided with a fixing hole 203a through which the large diameter portion 211b of the wire fixing member 211 is press-fitted or screwed. Thus, even if the tension of the wire 230 is increased by the wire winding member 220, the wire fixing member 220 can be stably fixed to the inner plate 203, so that the curvatures of the inner plate 203 and the display panel 201 can be changed.

The wire winding member 220 includes a cylindrical main body 221, a rotation member 223 configured to rotate when the wire 230 is wound, a support member 225 configured to rotate together with the rotation member 223, etc. The wire winding member 220 is coupled to the central portion of the back cover 205 and is connected to the wire fixing member 211 coupled to a corner portion of the inner plate 203 by the wire 230.

The main body 221 of the wire winding member 220 is formed in a cylindrical shape and is fixed to the rear surface of the back cover 205 and the rotation member 223 passes through the main body 221. The rotation member 223 includes, at one end thereof, a winding portion 223a, which is located inside the back cover 205 and is configured to wind the wire 230 therearound.

Accordingly, the wire 230 connected to the wire fixing member 211 is connected to the winding portion 223a through the space between the rear surface of the inner plate 203 and the front surface of the back cover 205. The wire 230 is wound to increase the tension thereof while being wound around the rotation member 223 in one direction, so that the wire 203 is capable of changing the curvature by pulling the corner portion of the inner plate 203, to which the wire fixing member 211 is coupled, to the back cover 205.

The other end of the rotation member 223 passes through the support member 225 and rotates integrally with the rotation member 223 and is supported on the upper surface of the main body 221. The fixing member 227, which is coupled while passing through a fixing hole 224b formed on the outer peripheral surface of the other end, is supported on the upper surface of the support member 225 so as to prevent the support member 225 from being separated and rotated.

Accordingly, when the curvature adjustment is required, the user may remove the fixing member 227 from the fixing hole 224b of the rotation member 223 and may rotate the rotation member 223 so as to adjust the tension of the wire 230. When the adjustment is completed, the user may insert the fixing member 227 into the fixing hole 224b of the rotation member 223, so that the support member 225 can be supported and fixed on the upper surface of the main body 221.

The wire winding member 220 may further include an elastic member 229 for applying an elastic force to pull the support member 225 toward the main body 221 in order to maintain the support force of the support member 225 and the main body 221.

Here, the elastic member 229 is inserted into the inner peripheral surface of the main body 221. One end 229a of the elastic member 229 is supported in an engagement groove 221c that is formed to extend in the radial direction from the inner peripheral surface of the main body 221, and the other end 229b of the elastic member 229 is fixed to an engagement hole 224a formed on the outer peripheral surface of the rotation member 223 such that the elastic member 229 applies an elastic force that pulls the support member 225 toward the main body 221 in the state of being tensioned by a predetermined length during assembly.

Therefore, the elastic force of the elastic member 229 is added to the elastic force of the support member 225 to the support force of the fixing member 227, so that the support force of the support member 225 on the upper surface of the main body 221 is increased.

In addition, the outer peripheral surface of the main body 221 is provided with a fastening portion 222 protruding in the radial direction and supported on the rear surface of the back cover 205 so as to be fixed to the back cover 205 with the fastening member 208, and a fastening hole 205a, into which the fastening member 208 is coupled, and an insertion hole 205b, into which the winding portion 223a of the rotation member 223 is inserted, are formed in the fastening member 205.

Accordingly, the wire winding member 220 is configured such that the main body 221 can be firmly coupled to and supported by the rear surface of the back cover 205 while the wire winding portion 223a is inserted to be positioned inside the back cover 205.

The rotation member 223 may be provided with at least one anti-slip portion 226 on the outer peripheral surface of a cylinder portion 224, which passes through the support member 225 so as to be engaged with the support member 225, which prevents the rotation member 223 from slipping with respect to the support member 225 during the rotation of the rotation member 222.

Here, in the anti-slip portion 226, the cylinder portion 224 is illustrated as being formed to have a hexagonal column shape with the outer peripheral surfaces of the cylinder portion 224 being flat as an example. However, the anti-slip portion 226 is not necessarily limited to this. A protrusion may be formed on the outer peripheral surface of the cylinder portion 224, and a groove may be formed in the inner peripheral surface 212 of the support member 225 such that the protrusion is engaged with the groove. Further, any anti-slip structure is possible as long as the cylinder portion 224 does not slip with respect to the support member 225.

In addition, the winding portion 223a of the rotation member 223 may be provided with enlarged flanges 223b, which protrude radially from the outer peripheral surface of the cylinder portion 224 and are axially spaced apart from each other, and the wire 230, which is connected to the winding portion 223a, is prevented from being separated due to the enlarged flanges 223b.

The upper surface of the main body 221 and the lower surface of the support member 225 are provided with engagement teeth 228 and 226 which are engaged with each other, so that it is possible to prevent the rotation member 223 and the support member 225 from being rotated in the state in which the tension adjustment of the wire 230 is terminated, thereby preventing the wire 230 from being unwound.

In addition, in order to ensure that wire winding member 220 is rotated in one direction where the wire 230 is wound but is not rotated in the other direction where the wire 230 is unwound, the engagement teeth 228 and 226 may include: first tooth surfaces 226a and 228a, which protrude in the axial direction of the wire winding member 220 and are supported in the axial direction and between the vertical surfaces thereof; and second tooth surfaces 226a and 228b, which are provided as circumferentially inclined surfaces from one ends 226c of the first tooth surfaces 226a and 228a and are connected to the other ends of first tooth surfaces 226a and 228a which are adjacent thereto. The first tooth surfaces and the second tooth surfaces may be continuously arranged.

That is, referring to FIG. 7, which illustrates a case in which the winding direction of the wire 230 is clockwise, when the support member 225, which is rotated together with the rotation member 223, is rotated in the clockwise direction, the most protruding ends 226c of the first tooth surfaces 226a of the support member 225 are engaged with the first tooth surfaces 226a, which are adjacent thereto along the inclined surfaces of the second tooth surfaces 228b of the main body 221.

In addition, when the most protruding ends 226c of the first tooth surfaces 226a of the support member 225 rises along the inclined surfaces of the second tooth surfaces 228b of the main body 221, the support member 225 and the main body 221 are disengaged in the axial direction.

At this time, the elastic member 229 is stretched by the axially disengaged amount between the support member 225 and the main body 221 so as to generate elastic restoring force, and when the most protruding ends 226c of the first tooth surfaces 226a of the support member 225 move over the inclined surfaces of the second tooth surfaces 228b of the main body 221 and are engaged with the first tooth surfaces 226a of the main body 221, which are adjacent to the inclined surfaces, the support member 225 and the main body 221 are returned to the engaged state by the elastic restoring force of the elastic member 229.

When the support member 225 and the main body 221 are returned to the engaged state, the support member 225 and the rotation member 223 generate a force for returning counterclockwise due to the tension of the wire 230. However, since the first tooth surfaces 226a of the main body 221 and the first tooth surfaces 228a of the main body 221 are configured to be supported perpendicularly to this force, the support member 225 and the rotation member 223 are prevented from being rotationally returned.

Therefore, in the case where curvature adjustment is required, when the user rotates the rotation member 223 clockwise until a desired curvature is secured, the support member 225 is separated from the upper surface of the main body 221, thereby adjusting the curvature of the display panel 201, and when the adjustment is completed, the support member 225 is stopped while being supported on the upper surface of the main body 221.

A pin coupling hole 223c, to which a pin 214 for fixing the wire 230 is coupled, is provided on the outer peripheral surface of the spiral part 223a, so that when the wire 230 is fixed, the wire 230 is fixed to the winding portion 223a without being separated.

In the embodiments of the present disclosure, at least one wire fixing member 211 and at least one wire winding member 220 may be provided as illustrated in FIG. 10. However, the present disclosure is not limited to FIG. 10, and one wire wounding member may be connected two wire fixing members by a wire.

Meanwhile, the drawings of the embodiments of the present disclosure illustrate only a case where the display panel is a light-emitting display panel, as an example. However, as described above, the embodiments of the present disclosure are also applicable to a case where the display panel is a liquid crystal display panel. In this case, the backlight module, which provides light to the liquid crystal display panel, includes a light source module, and a light guide plate configured to process the light emitted from the light source module so as to provide appropriate light to the liquid crystal panel, a light adjustment member, and a light reflector. Here, the light source module is a component that converts electric energy into light energy, and components such as a Light-Emitting Diode (LED) assembly, a Cold Cathode Fluorescent Lamp (CCFL), or a Hot Cathode Fluorescent Lamp (HCFL) may be used. Since this is well known in the art to which the embodiments of the present disclosure belong, a detailed description thereof will be omitted.

As described above, according to the embodiments of the present disclosure, it is possible to provide a display device in which the curvature of a display panel is adjustable with a curvature adjustment member having a simple structure, thereby greatly reducing the number and weight of components, and various curvatures required by consumers can be implemented without substantial restrictions in a manufacturing apparatus, a process, or the like.

In addition, according to the embodiments of the present disclosure, when the front surface of a display panel is deformed into a concave cup-shaped curved surface due to a manufacturing tolerance of the flat display panel and the al expansion of the display panel during use, the curved shape can be adjusted into the flat shape again, thereby enhancing the user's convenience and product satisfaction.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
   a display panel;
   an inner plate configured to support a rear surface of the display panel;
   a back cover provided on rear surface of the inner plate such that the display panel and the inner plate are embedded inside; and
   a curvature adjustment member comprising a wire fixing member coupled to at least one of corner portions of the inner plate and a wire winding member coupled to a central portion of the back cover so as to adjust a tension of a wire connected to the wire fixing member, and
   wherein the wire winding member comprises:
   a cylindrical main body fixed to the rear surface of the back cover;
   a rotation member passing through the main body and comprising, at one end thereof positioned inside the back cover, a winding portion around which the wire connected to the wire fixing member is wound;
   a support member through which a remaining end of the rotation member passes so as to be integrally rotated therewith, the support member being supported on the upper surface of the main body; and
   a fixing member coupled through an outer peripheral surface of the remaining end of the rotation member so as to prevent the support member from being separated and rotated.

2. The display device of claim 1, wherein the wire fixing member comprises a small diameter portion to which the wire is coupled, and large diameter portions having an enlarged diameter are provided on opposite sides of the small diameter portion.

3. The display device of claim 2, wherein the rear surface of the inner plate is provided with a fixing hole in which a large diameter portion of the wire fixing member is press-fitted or screwed.

4. The display device of claim 1, further comprising:
   an elastic member inserted into an inner peripheral surface of the main body and having one end supported by an engagement groove enlarged in a radial direction from the inner peripheral surface of the main body and a remaining end fixed to an outer peripheral surface of the rotation member so as to apply an elastic force to pull the support member toward the main body.

5. The display device of claim 4, wherein the main body comprises, on an outer peripheral surface thereof, a fastening portion protruding in a radial direction and supported on the rear surface of the back cover such that the main body is fixed to the back cover with a fastening member.

6. The display device of claim 4, wherein the rotation member comprises at least one anti-slip portion on an outer peripheral surface of a cylinder portion, through which the support member passes, to be engaged with the support member.

7. The display device of claim 4, wherein the winding portion of the rotation member comprises enlarged flanges protruding radially from the outer peripheral surface of the cylinder portion and spaced apart from each other in an axial direction.

8. The display device of claim 4, wherein the upper surface of the main body and a lower surface of the support body are provided with engagement teeth which are engaged with each other.

9. The display device of claim 8, wherein the engagement teeth comprise:
  first tooth surfaces, which protrude in an axial direction so as to be rotatable in only one direction and are supported in the axial direction and between vertical surfaces; and
  second tooth surfaces, which are provided as circumferential inclined surfaces at one ends of the first tooth surfaces and are connected to remaining ends of the first tooth surfaces adjacent thereto the second tooth surfaces, wherein the first tooth surfaces and the second tooth surfaces are continuously arranged.

* * * * *